US005612671A

United States Patent [19]
Mendez et al.

[11] Patent Number: 5,612,671
[45] Date of Patent: Mar. 18, 1997

[54] METHOD OF LEARNING TIRE PRESSURE TRANSMITTER ID

[75] Inventors: Victor Mendez; Todd D. Eberwine, both of Kokomo, Ind.

[73] Assignee: Delco Electronics Corp., Kokomo, Ind.

[21] Appl. No.: 574,097

[22] Filed: Dec. 11, 1995

[51] Int. Cl.⁶ .................................................. B60C 23/00
[52] U.S. Cl. .................... 340/447; 340/531; 73/146.5; 200/61.25
[58] Field of Search .................... 340/447, 442, 340/531; 73/146.5; 200/61.25

[56] References Cited

U.S. PATENT DOCUMENTS

| | | | |
|---|---|---|---|
| 4,130,817 | 12/1978 | Hill et al. | 73/146.5 |
| 4,163,208 | 7/1979 | Merz | 340/58 |
| 4,186,377 | 1/1980 | Barabino | 73/146.5 |
| 4,237,728 | 12/1980 | Betts et al. | 340/447 |
| 4,316,176 | 2/1982 | Gee et al. | 340/447 |
| 4,443,785 | 4/1984 | Speranza | 340/447 |
| 5,061,917 | 10/1991 | Higgs et al. | 340/531 |
| 5,109,213 | 4/1992 | Williams | 340/447 |
| 5,228,337 | 7/1993 | Sharpe et al. | 73/146.5 |
| 5,285,189 | 2/1994 | Nowicki et al. | 340/447 |
| 5,289,160 | 2/1994 | Fiorletta | 73/146.5 |
| 5,289,369 | 2/1994 | Hirshberg | 364/401 |
| 5,463,374 | 10/1995 | Mendez et al. | 340/442 |

Primary Examiner—Thomas Mullen
Assistant Examiner—John Tweel, Jr.
Attorney, Agent, or Firm—Mark A. Navarre

[57] ABSTRACT

A low tire pressure warning system has a pressure sender and a radio transmitter in each tire, and a vehicle mounted receiver includes a microprocessor controller programmed to automatically learn the IDs of the tire senders. An ID message and pressure report is transmitted from each sender and recorded in memory as main senders presumed to be those on the vehicle wheels. Subsequent new IDs are accepted as reserve senders. By monitoring sender activity the main senders are determined to be healthy or damaged and are replaced when not functioning by new sender IDs which are functioning.

13 Claims, 6 Drawing Sheets

METHOD OF LEARNING TIRE PRESSURE TRANSMITTER ID

FIELD OF THE INVENTION

This invention relates to the management of information in a low tire pressure warning system and particularly to a method of learning the identification of individual tire-mounted transmitters and of detecting damaged transmitters.

BACKGROUND OF THE INVENTION

It has previously been proposed to monitor tire pressure by a transducer within each vehicle tire. Several schemes have been tried for advising the vehicle operator of tire pressure conditions, especially in the case of low tire pressure. It is known, for example, to generate a visible signal at the tire and to visually inspect the signal. It is also known to generate a magnetic field at the transducer in response to a low pressure condition, to detect the field by a detector mounted near each wheel, and to display a warning on the instrument panel. It has also been proposed to mount a transducer and radio transmitter within each tire and a receiver on the vehicle dedicated to processing transmitted tire pressure data and displaying necessary information.

One known system using tire-mounted transmitters and a receiver has the feature of displaying which of the four tires has low pressure. Four transmitter identification numbers (IDs), each dedicated to a tire position, are supplied for all vehicles so that the manufacturer must supply four different part numbers to service the four IDs and a customer would have to order replacement according to wheel position. With this system a receiver may pick up a valid ID from a neighboring vehicle, thereby obtaining false information, and tire rotation would cause confusion in the displayed information.

It has also been proposed in a transmitter-receiver system to have only one transmitter part number with each transmitter having a unique ID. On this system it is required to have a learning method to marry four sender IDs to a particular receiver. One way of doing this is by approaching each tire with a magnet close to each sender location to trigger a transmission that would be captured by the receiver. At this point the receiver needs to be placed in a learn mode to be able to program each sender ID in permanent memory. A predetermined order of wheel positions needs to be followed to program the senders for specific display positions. This arrangement requires human intervention as well as a programming tool for teaching the tire sender IDs.

SUMMARY OF THE INVENTION

It is therefore an object of the invention in a low tire pressure warning system to learn the transmitter IDs of senders on the vehicle without human intervention or special tools. Still another object is to automatically learn new IDs for replacement senders. Another object is to detect a damaged sender.

The subject method requires only one transmitter part number, each unit having a different code. Each sender or transmitter has an inertial switch which triggers a message transmission at a given wheel speed. The message contains a unique ID and a tire pressure status flag. There is no attempt to relate each transmitter to a specific wheel position. Rather, the approach is to learn the IDs of the transmitters on the vehicle tires as well as additional IDs as candidates for replacement of the current active transmitters.

A microprocessor in the receiver stores each transmitter ID as messages are received. The four IDs from the four tires comprise main IDs and additional messages from other transmitters comprise reserve IDs. The additional IDs may be emitted by other vehicles or may be from a new wheel replacement. A table in microprocessor memory stores a main ID list and a reserve ID list as well as a record of recent activity of each transmitter and the reported tire pressure status. Algorithms sensitive to the presence or absence of current ID transmissions discriminate between active and inactive transmitters to remove an inactive ID from the main list and replace it with an active ID from the reserve list; this automatically installs a new ID when a wheel is replaced or corrects the main list when a signal from another vehicle is originally placed on the main list. If there is no replacement in the reserve list, an indication of sender damage is displayed. Whenever all four main transmitters are currently active, which is the normal state, all reserve IDs are erased.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
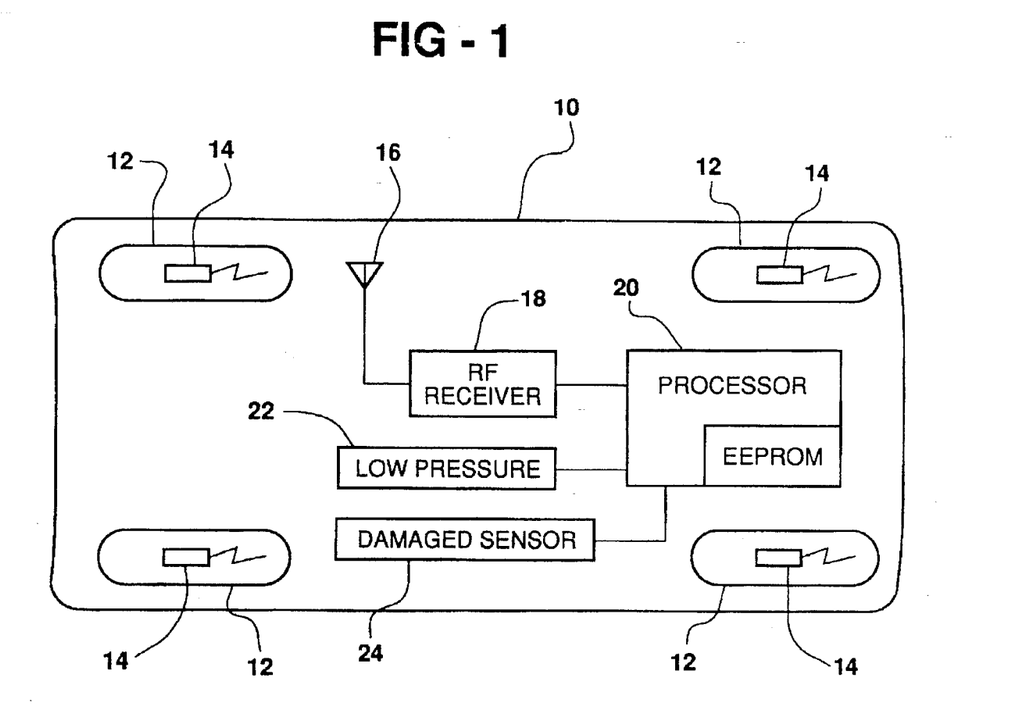
FIG. 1 is a schematic diagram of a low tire pressure warning system according to the invention.

Referring to FIG. 1, an automotive vehicle 10 has four tires 12, each equipped with a tire pressure sender (or transmitter) 14 residing within the tire and subject to tire pressure for transmitting radio signals carrying pressure related information. Each sender 14 has a unique identification code (ID) which is included in every transmission to verify the source of the signal. Transmitted signals are received by an antenna 16 coupled to a receiver 18. The receiver output data is fed to a processor 20 which is a microprocessor having a non-volatile memory such as an EEPROM for storage of tire ID and pressure data as well as a record of current transmitter activity. An algorithm within the microprocessor manages and evaluates the data and issues a low tire pressure signal to activate a tell-tale display 22 when a transmitted message indicates such a condition, and issues a damaged sender signal to activate a tell-tale display 24 when the pattern of received messages reveals less than four active senders.

Figure 2:
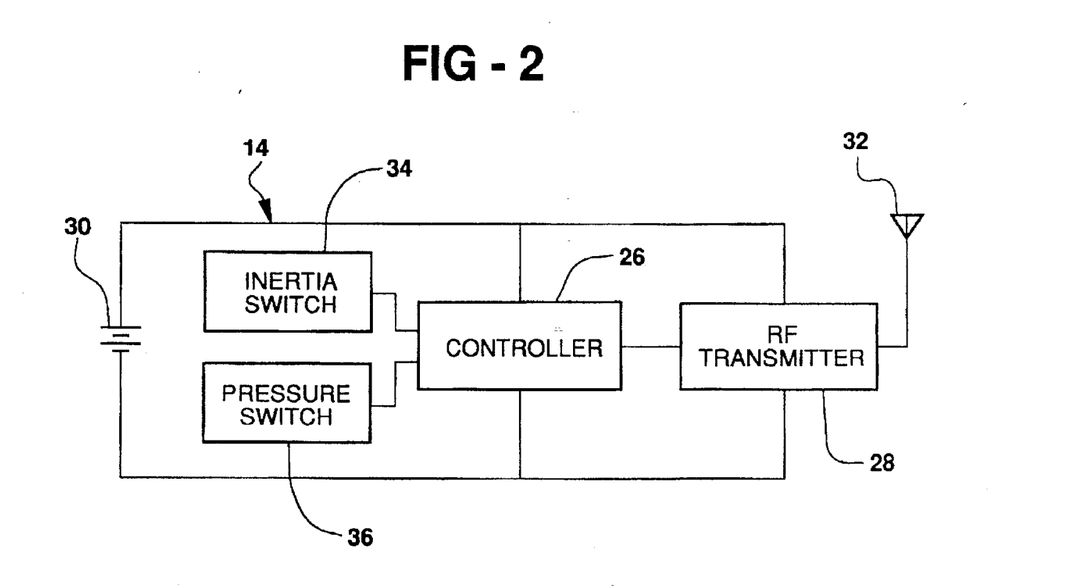
FIG. 2 is a schematic diagram of the tire pressure sender portion of the system of FIG. 1.

The tire pressure sender 14, as shown in FIG. 2, has a controller 26 and an RF transmitter 28, each powered by a battery 30, and a transmitter antenna 32. The controller comprises a microprocessor configured to maintain a sleep state requiring very low power consumption until it is awakened by some external event. The controller 26 has a data output coupled to the transmitter 28 for defining the transmitted signal. Inputs to the controller 26 are an inertia switch 34 and a pressure switch 36.

The inertia switch 34 is sensitive to tire speed and is actuated when the tire speed reaches a predetermined value which, for example, corresponds to a vehicle speed of 25 mph. The switch actuation prompts the controller to wake up momentarily and send a state of health message via the transmitter, and then return to the sleep state. Preferably the message is sent five times, randomly spaced over a period of a few minutes to assure that it is received. The processor 20, in turn, notes each state of health message which not only verifies the operability of the sender but also carries a tire pressure status code and the ID. Thus each tire pressure sender is occasionally sampled to verify its operability.

The pressure switch 36 is set to change state (open or closed) at a suitable warning pressure. As the pressure in a tire drops below the set pressure the switch changes state and the controller is awakened to cause transmission of a message containing a low pressure code. When pressure is restored to the tire, the pressure switch reverts to its original state and the controller is awakened to transmit a message with a pressure OK code. The processor 20 responds to the messages by suitably activating or deactivating the low pressure tell-tale 22. Every message, whether initiated by the pressure switch 36 or the inertia switch 34, contains the transmitter ID.

In the processor 20, the RAM contains a table accommodating eight ID entries comprising a main list normally containing the IDs of the four active senders currently mounted on the vehicle, and a reserve list holding up to four additional IDs which are candidates for replacement of a main list entry which is no longer active. The table has positions for status and activity flags or values which are referred to by the operating algorithms. Two different activity periods are used to gauge sender activity: one is based on a timeout period which begins when a report is received from any transmitter and lasts for a few minutes, the other is the ignition cycle which lasts as long as the vehicle ignition is turned on. Current activity of each sender is determined by recording receipt of a report by setting a flag, counting failures to report within an ignition cycle and counting contiguous ignition cycles in which a maximum number of failure are counted. Certain data is copied to the EEPROM.

The table includes the following entries for each sender:
1. The ID.
2. Table in Use Flag—indicates that an ID is entered.
3. Pressure Flag—indicates whether tire pressure is high or low.
4. Ignition Failure Counter (IgnFail)—stores the number of times (to a maximum of three) of contiguous ignition cycles elapsed with no report.
5. Damage Flag—indicates whether there are damages. (The data listed above is copied to the EEPROM and the data listed below is stored in the RAM table only.)
6. Current Report Flag (REPORTED)—indicates that the transmitter has reported during the timeout period.
7. Ignition Report Flag (IgnRep)—indicates that the transmitter has reported during the present ignition cycle.
8. Failure to Report Counter (FAILURE)—stores the number of times (to a maximum of three) the sender has failed to report during the last three timeout periods.

The receiver is powered only by vehicle ignition voltage so that data in the processor RAM does not survive the ignition off periods. Accordingly those flags or counters which are held only in RAM are reset to default values at the beginning of each ignition cycle. Those values along with the IDs and other data read from the EEPROM table make up a complete table in RAM for use by the algorithm. When a message on report is received the ID and other parameters are initially held in a buffer. If the message is accepted any new data is copied into the RAM table. If the ID is new it is also saved to the EEPROM.

The algorithm for learning sender IDs and for recognizing a damaged sender is represented by the flow charts of FIGS. 3–7 wherein the functional description of each block in the charts is accompanied by a number in angle brackets <nn> which corresponds to the reference number of the block. The term "TX" refers to the particular sender being processed and in particular is used in reference to the table position, 1–8, of the sender.

Figure 3:
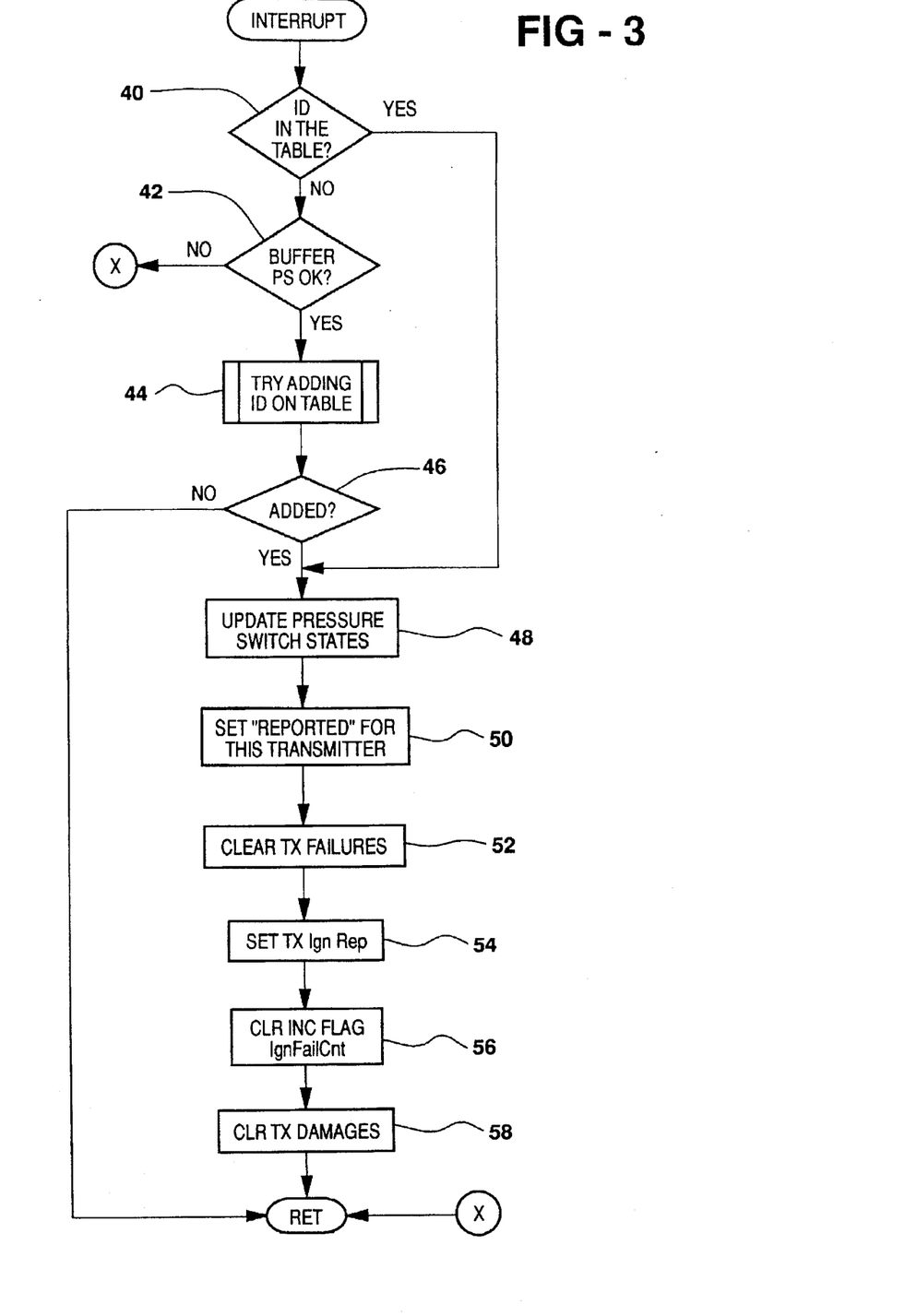
FIGS. 3 to 7 are flow charts showing the operation of the receiver portion of the system according to the invention.

A flow chart for processing messages is shown in FIG. 3. The process starts with an interrupt caused by receipt of a message. If the ID of the sender is not in the table <40> and the pressure flag in the buffer indicates low pressure <42> the message is rejected, but if the pressure is OK the program (FIG. 4) tries to add the ID to the table <44>. If the ID is successfully added <46> or the ID is in the table <40>, the pressure switch state is updated <48>. Then the REPORTED flag is set for that transmitter (TX) <50>, the TX FAILURE counter is cleared <52>, the TX ignition report (IgnRep) is set <54>, the INC flag and the IgnFail counter area cleared <56> and the TX Damage flag is cleared <58>.

Figure 4:
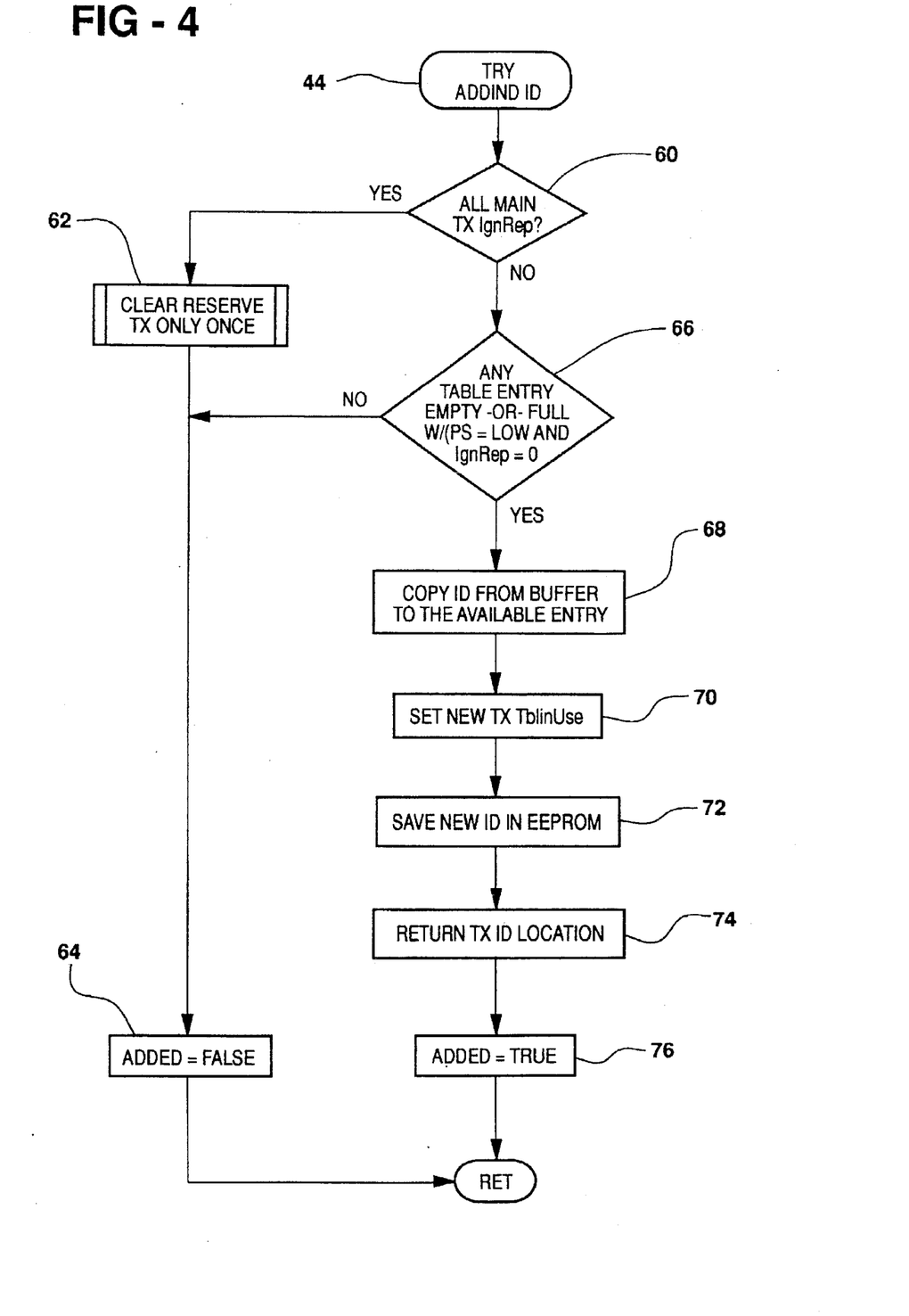

The Try Adding ID routine called by the block 44 is shown in FIG. 4. If the IgnRep flag is set for all of the main ID positions (first four table entries) <60>, the four active transmitters on the wheels are all operating and no other IDs can be valid; thus the reserve ID positions are all cleared <62> and an ADDED flag is set to false <64>. The reserve IDs are cleared only once in each ignition cycle to minimize changes to the EEPROM. If the block 60 condition is not true the entries are tested beginning with the first position for an empty entry or a full entry with a low pressure flag and the IgnRep flag is not set <66>. The latter condition suggests that a tire was deflated and the wheel was removed from the vehicle. The new report being added may be from a replacement wheel. If either condition is met, the new ID is copied from the buffer to the vulnerable position in the RAM table <68> and a table in use flag is set for that position <70>. The new ID is also saved in EEPROM <72>, and its location in the table is returned <74> for use in steps 48–58 of FIG. 3 which need to know which table position is affected. Finally the ADDED flag is set to true <76>, also for use in the FIG. 3 program at step 46.

It will be apparent that for a new receiver the table will be empty and the first four reports with OK pressure will supply the main IDs by the Try Adding ID routine. Any additional reports will be rejected if the main positions all have an IgnRep flag (step 60) but if not, the additional reports can supply IDs to the reserve table entries. Such additional reports may come from other vehicles within transmitter range.

Figure 5:
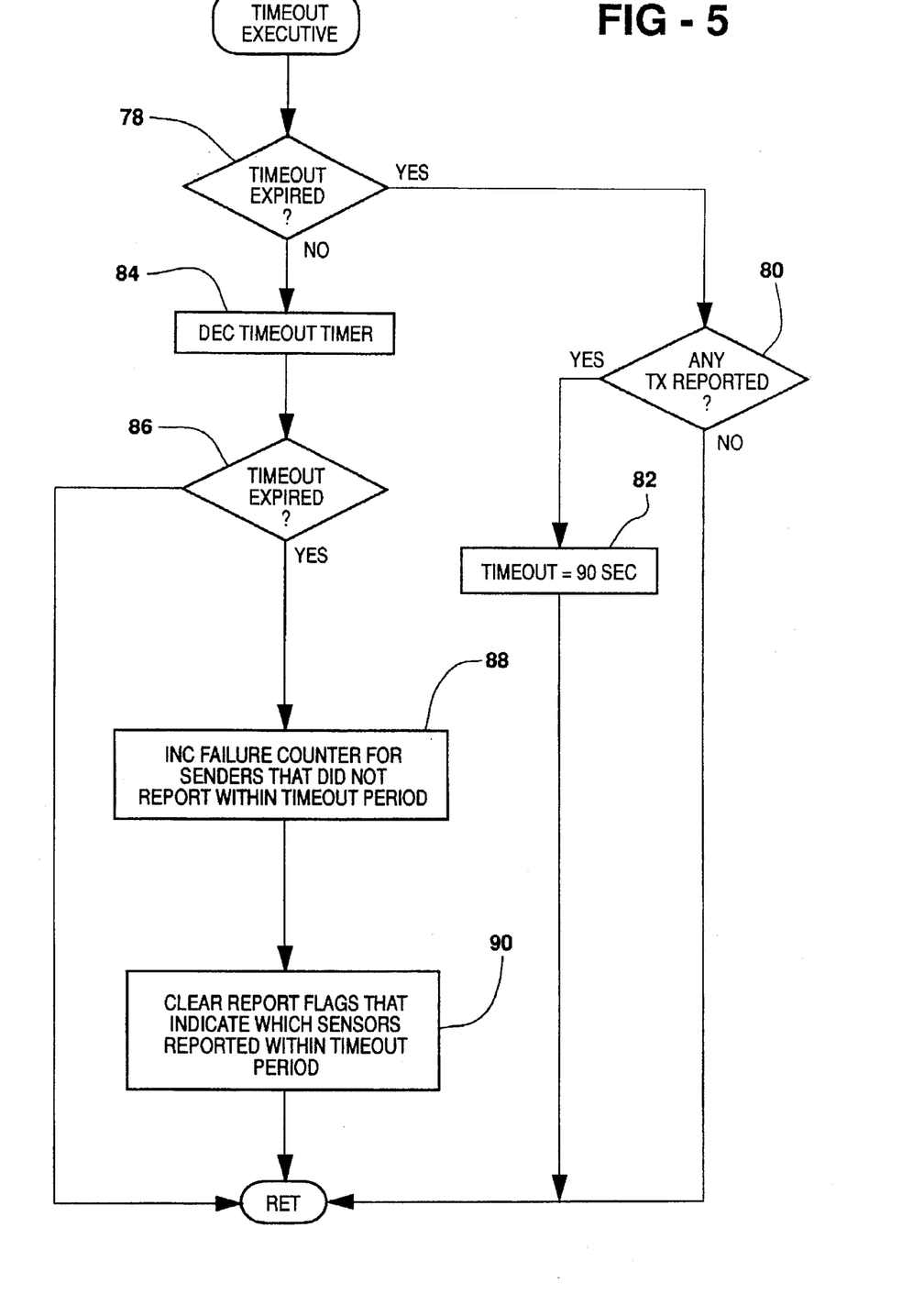

A timeout executive Shown in FIG. 5 is run periodically to count any failure to report. If the timeout has expired <78> and a report is received from a sender <80>, the timeout period is set for 90 seconds or other desired value <82>. The timeout periods begin typically when the wheels reach the speed which triggers the inertia switches and is set to allow each sender time to report following the first to report. When the timeout is not expired <78> the timer is decremented <84>. If the timeout has then expired <86>, a Failure Counter is incremented <88> for any sender that did not report during the timeout period, and all Reported flags are cleared <90> to prepare for the next timeout period.

Figure 6:
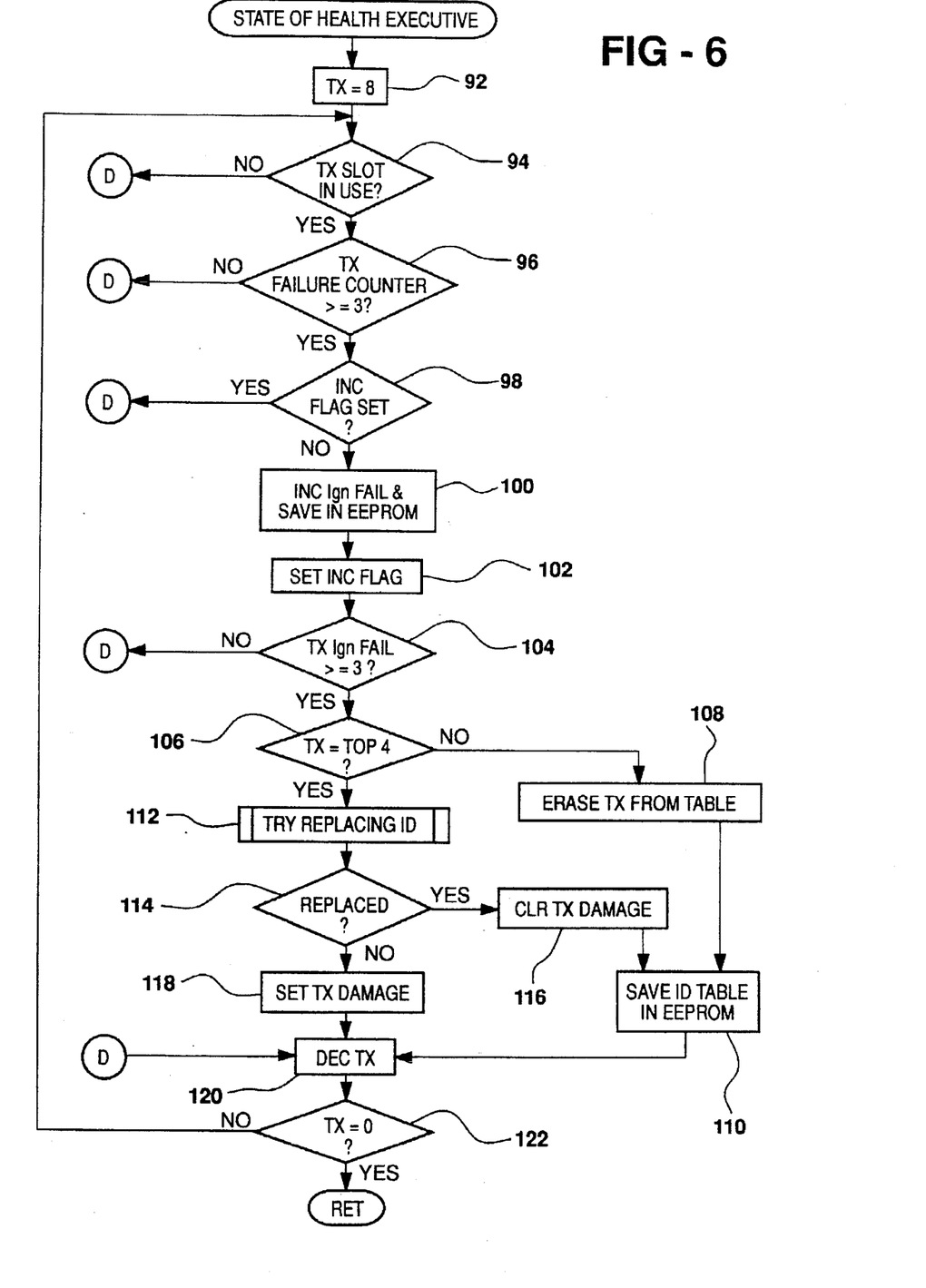

A state-of-health executive shown in FIG. 6 is used to scan the table from bottom to top to seek failures in each position. Initially TX is set equal to 8 <92> to designate the bottom of the table. Then if the TX position is in use <94> as determined from the table-in-use flag, and if the TX Failure counter is at least three (or other set value) <96> the INC flag is checked <98>. If it is not set the IgnFail counter is incremented and saved in EEPROM <100> and the INC flag is set <102>. The INC flag when checked by step 98 prevents incrementing the IgnFail counter again in the same ignition period, but when the ignition voltage is turned off the flag is not saved and the counter can be incremented in the subsequent period. Also, note that if a new report is received for that TX, the IgnFail counter and the INC flag are cleared in step 56. If the IgnFail count has reached a set value <104> and the TX is for a reserve position (5–8) <106>, the TX entry is erased <108> and the table revision is saved in EEPROM <110>. If the TX is for a main position, the Try Replacing ID routine (FIG. 7) is run <112> and if replacement is successful <114> any damage flag for that position is cleared <116> and the revised table is saved in EEPROM <110>. If the replacement was not made <114>, a damage flag is set for that position <118> to trigger the damage tell-tale. Thus if a main sender is deemed to have failed and there is no successor to replace it in the main table, a damage warning is effected. Then the TX is decremented <120> to repeat the routine for the next higher table position. When TX=0 the routine is exited.

Figure 7:
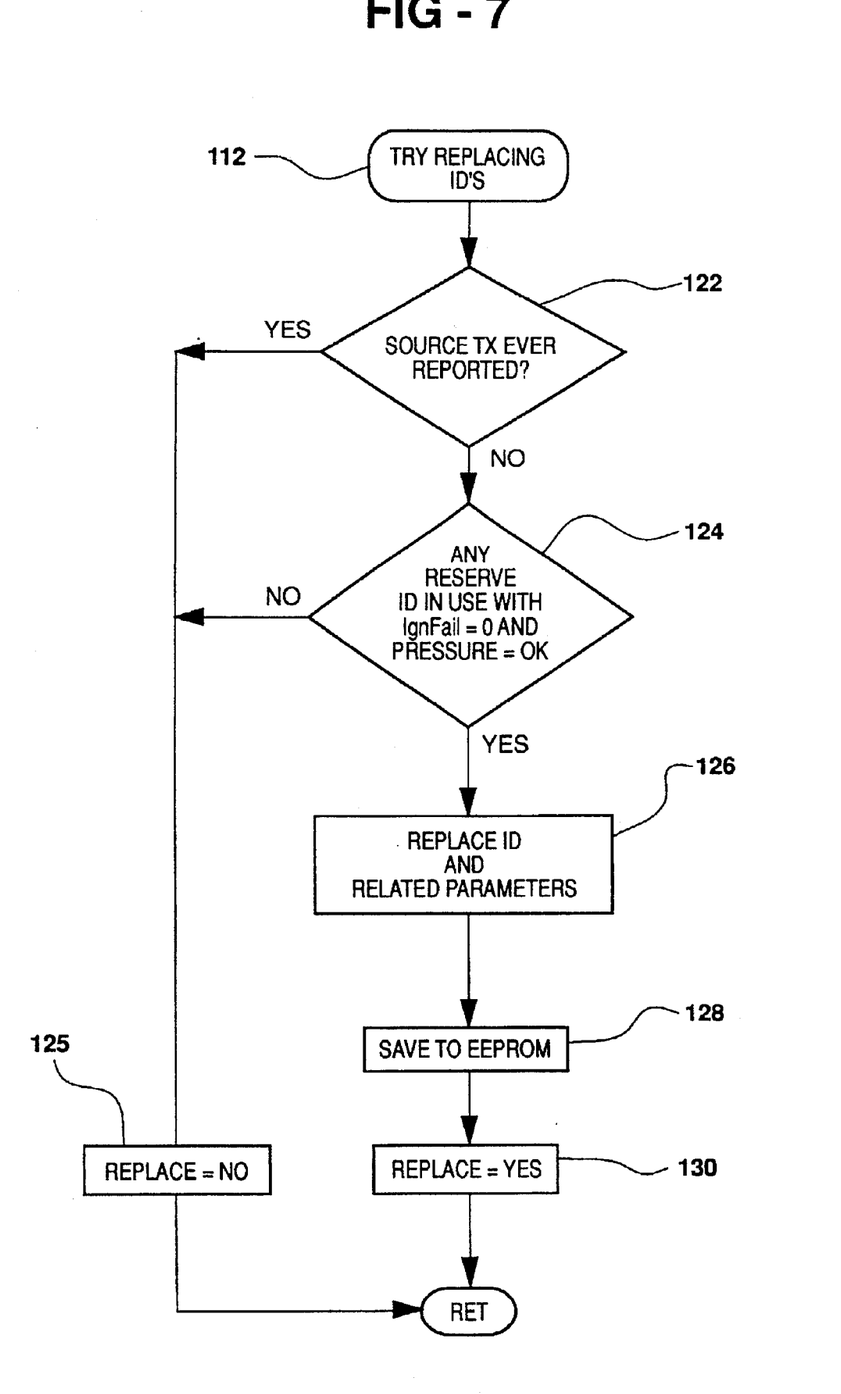

The Try Replacing ID routine 112, FIG. 7, attempts to replace a main entry with a reserve entry. If the IgnRep flag is set <122>, indicating that a report was received in the current ignition period, the REPLACED flag is set to NO <125>. Where the IgnRep flag is not set <122>, the program looks for a reserve ID which is in use with no ignition period failures and OK pressure <124>. If no such reserve ID is found no replacement is made, but if one is found the main ID in question and its parameters is replaced by the reserve ID and its related parameters <126> which are saved to the EEPROM <128>. Then the REPLACED flag is set to YES <130>.

It will thus be seen that initially the first reports received are adopted as the main sender reports and their IDs are recorded. Subsequent report from new senders are adopted as reserve IDs. Then by monitoring the activity of the received reports the health of each sender can be evaluated and if a main sender is no longer performing it can be automatically replaced by a reserve sender which has good performance or else a damage warning is displayed.

The embodiments of the invention in which an exclusive property or privilege is claimed are defined as follows:

1. In an automotive low tire pressure warning system having a transmitter in each vehicle tire for sending messages comprising transmitter identification (ID) and pressure data to a receiver, the receiver having a memory for a table of transmitter IDs and associated parameters, a method of learning the transmitter IDs during vehicle operation comprising the steps of:

storing in the table received IDs which are not associated with low tire pressure in the table;

monitoring the activity of each transmitter to detect transmission failure When transmitters should be active;

counting failures of each transmitter; and deleting from the rabble the ID of a transmitter having a limit number of failures.

2. The invention as defined in claim 1 wherein the step of monitoring comprises:

recording transmitter activity for a period beginning when one transmitter reports good tire pressure; and detecting a failure when a transmitter does not report during the period.

3. The invention as defined in claim 1 wherein an ignition cycle begins when vehicle ignition is turned on and wherein:

the step of counting failures comprises counting failures within an ignition cycle and incrementing an ignition counter once in the cycle when the failures reach a preset value, and further incrementing the ignition counter only when the failures reach the preset value in contiguous ignition cycles; and deleting the transmitter ID when the ignition counter is incremented to a maximum count.

4. In an automotive low tire pressure warning system having a transmitter in each of four tires for sending messages comprising transmitter identification (ID), low tire pressure signals and state of health signals to a receiver, the receiver having a memory for a table of transmitter IDs and associated parameters, a method of learning; the transmitter IDs comprising the steps of:

storing the first four received IDs which are not associated with a low tire pressure signal as IDs of main transmitters;

storing a limited number of subsequent IDs as IDs of reserve transmitters;

monitoring the operation of each transmitter during vehicle operation; and replacing an ID of a main transmitter with a reserve ID when the main ID is not received during a prescribed amount of operation.

5. The invention as defined in claim 4 wherein the method further determines transmitter damage, wherein transmitters are set to transmit a signal when tire speed attains a set value, and wherein the step of replacing an ID comprises:

starting a timeout time when a first ID is reported;

recording a report for each received ID;

after expiration of the timeout, incrementing a failure counter for each transmitter in the table which failed to report;

determining transmitter damage on the basis of the failure counter; and when transmitter damage is determined, attempting to replace its ID with a reserve ID which is currently reporting.

6. The invention as defined in claim 5 wherein the system has a damage indication light and wherein:

activating the damage indication light when transmitter damage is determined and there is no reserve ID which is currently reporting.

7. The invention as defined in claim 5 wherein an ignition cycle begins each time the vehicle ignition is turned on and wherein the step of determining transmitter damage comprises:

for each transmitter ID, incrementing an ignition counter once in each ignition cycle if the failure counter reaches a maximum number; and determining transmitter damage when the ignition counter reaches a preset limit.

8. The invention as defined in claim 7 wherein:

when an ID is received which matches an ID listed in the table, the failure counter and ignition counter for that ID are cleared.

9. The invention as defined in claim 4 wherein an ignition cycle begins each time the vehicle ignition is turned on and transmitters are set to transmit a signal when tire speed attains a set value, the method including:

starting a timeout period when a first ID is reported;

recording a report for each received ID;

after expiration of the timeout period, incrementing a failure counter for each transmitter in the table which failed to report;

for each transmitter ID, incrementing an ignition counter once in each ignition cycle if the failure counter reaches a maximum number; and if the ignition counter reaches a maximum value:

1) deleting the transmitter from the table if it is a reserve transmitter, 2) replacing the transmitter, if it is a main transmitter, with a reserve transmitter which has an ignition counter equal to zero and has no low tire pressure indication, and 3) flagging the transmitter as a damaged transmitter if it cannot be deleted or replaced by steps 1) or 2).

10. The invention as defined in claim 4 wherein an ignition cycle begins each time the vehicle ignition is turned on and including:

recording a report for each received ID;

when IDs for all main transmitters are received within one ignition cycle, deleting the IDs of reserve transmitters from memory.

11. The invention as defined in claim 4 wherein when a new message is received, the steps of:

comparing the received ID with IDs listed in the table; and updating the parameters of a corresponding ID when a match is found.

12. The invention as defined in claim 4 including the steps of:

when a new message is received, comparing the received ID with IDs listed in the table; and ignoring the message when a match is not found and the new message indicates a low tire pressure.

13. The invention as defined in claim 4 wherein an ignition cycle begins each time the vehicle ignition is turned on including the steps of:

when a new message is received, comparing the received ID with IDs listed in the table;

if the main transmitters have not all reported and the message does not indicate a low tire pressure condition, adding the message to the table if 1) there is an empty table entry or 2) there is a table entry with a low tire pressure indication with no reports during the present ignition cycle.

* * * * *